United States Patent [19]
Barvesten

[11] Patent Number: 5,864,765
[45] Date of Patent: Jan. 26, 1999

[54] METHOD AND ARRANGEMENT RELATING TO MOBILE TELEPHONE TERMINALS

[75] Inventor: Mats O. Barvesten, Hjärup, Sweden

[73] Assignee: Telefonaktiebolaget LM Ericsson, Stockholm, Sweden

[21] Appl. No.: 808,536

[22] Filed: Feb. 28, 1997

[30] Foreign Application Priority Data

Mar. 1, 1996 [SE] Sweden ................................ 9600822

[51] Int. Cl.⁶ .......................... H04Q 7/18; H04M 1/00
[52] U.S. Cl. ..................... 455/565; 455/550; 455/564; 455/565; 379/368
[58] Field of Search ................................ 455/550, 564, 455/565, 574, 575, 411, 343, 38.1, 137; 379/168, 182, 184, 190, 194, 368, 361, 200, 199, 193, 130, 131, 369

[56] References Cited

U.S. PATENT DOCUMENTS

| | | | |
|---|---|---|---|
| 4,087,638 | 5/1978 | Hayes et al. | 455/564 |
| 4,670,747 | 6/1987 | Borras et al. | 340/825.56 |
| 4,843,385 | 6/1989 | Borras | 455/411 |
| 4,860,336 | 8/1989 | D'Avello et al. | 455/409 |
| 4,933,963 | 6/1990 | Sato et al. | 455/569 |
| 5,212,810 | 5/1993 | Maeda et al. | 455/58.2 |
| 5,214,421 | 5/1993 | Vernon et al. | 340/825.03 |
| 5,235,635 | 8/1993 | Gulick | 379/368 |
| 5,241,583 | 8/1993 | Martensson | 379/58 |
| 5,247,565 | 9/1993 | Joglekar et al. | 455/565 |
| 5,313,523 | 5/1994 | Kawauchi | 381/104 |
| 5,317,632 | 5/1994 | Ellison | 379/199 |
| 5,438,612 | 8/1995 | Norimatsu | 379/58 |
| 5,555,550 | 9/1996 | Kaschke | 379/368 |
| 5,563,936 | 10/1996 | Washington | 379/184 |
| 5,570,418 | 10/1996 | Wu et al. | 379/199 |
| 5,621,402 | 4/1997 | Spak et al. | 379/368 |
| 5,754,602 | 5/1998 | Landry et al. | 379/368 |

FOREIGN PATENT DOCUMENTS

| | | |
|---|---|---|
| 319211 | 6/1989 | European Pat. Off. . |
| 567957 | 11/1993 | European Pat. Off. . |
| 1-143527 | 6/1989 | Japan . |
| 3-198559 | 8/1991 | Japan . |
| 3-252715 | 11/1991 | Japan . |
| 4-177957 | 6/1992 | Japan . |
| WO85/00719 | 2/1985 | WIPO . |

OTHER PUBLICATIONS

International–Type Search Report re SE 96/00221 Date of Mailing of report: Dec. 20, 1996.

Primary Examiner—Dwayne D. Bost
Assistant Examiner—Jean A. Gelin
Attorney, Agent, or Firm—Burns, Doane, Swecker & Mathis, L.L.P.

[57] ABSTRACT

The invention relates to the activation and automatic inactivation of keys on a mobile telephone terminal keypad, wherein the terminal includes a display and key depression sensing means. A time parameter denotes the length of time that has passed since a key was last pressed and is set to zero by means adapted to this end, and counting-up of the value of the time parameter is commenced subsequent to setting the time parameter to zero. The time parameter is compared with a threshold value (Tlock) and automatic inactivation of the keys in the keypad is initiated immediately the time parameter exceeds the threshold value (Tlock). An appropriately selected key is kept activated for activation during that time in which the keypad is in an inactivated mode, and the terminal is set to a stand-by mode.

8 Claims, 3 Drawing Sheets

METHOD AND ARRANGEMENT RELATING TO MOBILE TELEPHONE TERMINALS

FIELD OF INVENTION

The present invention relates to the field of mobile radio terminals, and more specifically to so-called terminal keyboard protection.

DESCRIPTION OF THE PRIOR ART

The complexity of modern mobile radio telephony equipment, such as mobile telephones, is progressively increasing. It is possible for a user of a mobile telephone to initiate a function by depressing solely one key on his/her keypad and therewith commence comprehensive traffic with another receiver. As a result of the development towards progressively smaller terminals, it is possible to keep the terminals in the pockets of users' clothing with the resultant risk of one or more keys on the mobile telephone being depressed unintentionally. The risk of this happening also increases with the time during which the telephone is activated. This may result in the setup of a call connection, for instance. In the worst of cases, the call will not be released until the owner of the terminal becomes aware that the terminal is switched-on. Mobile telephone calls are expensive and mobile telephones have a limited battery capacity. A person who is disturbed by an unintentional telephone call without reason may be irritated by the call, and the owner of the terminal may feel this irritating, unnecessary and embarrassing. It is therefore necessary to prevent undesirable and unintentional depression of the keys of a terminal keypad.

Several methods and arrangements for preventing the unintentional depression of keypad keys on mobile radio communications equipment, such as mobile telephones, are known to the art.

EP-A1-0 346 747 teaches the use of a hinged flap which when lowered functions to protect the keypad while the mobile telephone is not in use. The flap is lifted up to expose the keypad, when the telephone is to be used. The flap, or cover as it may also be called, is held in place with the aid of a spring or some other type of latching or holding means. The flap, the flap hinge and the latching device are made of plastic material. The flap hinge and the latching means are therefore liable to become worn quickly, such as to cause the flap to loosen from its attachment and therewith leave the keypad unprotected. It can be expensive to make repairs when the construction of the hinge or latching means is complicated. Moreover, the flap, or cover, may be loosened from the telephone for reasons other than long term wear. For instance, the flap may be loosened as a result of careless handling or as a result of damage caused by dropping the telephone accidently onto a hard surface.

In another known flap-mounting variant, the flap, or cover, can be moved forwards and backwards over the keypad. The fact remains, however, that this arrangement includes an additional loose element that can be loosened from the telephone in some way or another. Furthermore, mounting of the flap or cover on the terminal involves an additional manufacturing stage which adds to the cost of manufacturing the terminal. Handling of mobile telephones that are equipped with keypad protecting flaps, covers or shutters is also complicated by the fact that the user is required to open and close the flap manually.

The aforesaid mechanical keypad protectors prevent unintentional depression of keys, since the keys cannot be manipulated physically while the keypad is covered.

The problem of unintentional depression of the keys of a terminal keypad can also be solved by locking the keypad unit so that no signals will reach the data processing units even though the keys are activated, or so that no signals will be generated when a key is depressed. This solution can be achieved with a switch unit that is manually activated with the aid of a separate lock key. The keypad unit is locked in one position of the switch and is unlocked in the other position thereof. One drawback with this solution, however, is that the lock key can also be activated unintentionally such as to cause the switch to change from a locked to an unlocked position. This can occur when the terminal is placed in a pocket or in a bag among loosely-carried articles. This solution also complicates handling of a mobile telephone on the part of the user.

A user also desires the smallest possible number of keys on his/her terminal keypad. Small key numbers is also beneficial to the manufacturer, since a larger number of keys requires a larger amount of space. Manufacturer and user both desire small and easily handled mobile telephones.

All of the aforedescribed keypad locking devices are basically mechanical devices. However, electronic terminal locking equipment is also known to the art. Such equipment is known from U.S. Pat. No. 5,212,810, for instance. The purpose of this known automatic telephone lock facility is to prevent unauthorized use of the telephone. The telephone is locked automatically when exceeding a predetermined time period after unlocking or activating the telephone. This prevents an unauthorized person from using the telephone.

U.S. Pat. No. 4,670,747 teaches a mobile telephone equipped with an alphanumerical keypad and function keys and a display. Menu icons are positioned around the alphanumeric display surface. An icon is selected by sequentially stepping a cursor to the menu icon desired. Icon selection is effected with a MENU key. The icon is activated with a STEP key. If the user wishes to lock the keypad, he/she steps the cursor to the lock-icon with the aid of the MENU key and presses once on the STEP key. The keypad will then be locked until the user again presses on the STEP key. The locking procedure can be said to have menu support since said procedure is a function stored in an icon in the display. The procedure is manual.

U.S. Pat. No. 5,241,583 teaches a similar menu-based function selection procedure. Locking of the keypad, however, differs from the locking procedure just described. In this latter case, the keypad is locked or unlocked by depressing two separate keys in a particular sequence. This key depression combination is intended for use solely when locking and unlocking the keypad, and shall not be utilized during other usage of the keypad. Furthermore, the keys concerned will preferably be seated as far apart as possible. This reduces the risk of unlocking the keypad unintentionally, in distinction to the former case in which only one key needs be depressed in order to unlock the keypad. It is considered that there is less chance of depressing two widely spaced keys in a particular sequence than when only one key shall be depressed. The keypad is locked manually and no menu support is used. Alternatively, a time limit can be inserted between depression of the two keys in the locking sequence. This means that the second key in the sequence must be depressed within a given time period in order to unlock the keypad.

SUMMARY OF THE INVENTION

The present invention is concerned with the problem of preventing unintentional depression of keypad keys on a mobile radio terminal. As will be evident from the description of the prior art, various attempts to solve this problem have been made.

The problem includes how activation and automatic inactivation of the keypad can be achieved in a mobile radio terminal.

Another problem is how this activation and inactivation can be achieved in a manner that is easy to accomplish by a terminal user.

A further object of the present invention is therefore to prevent undesirable consequences when keys on the keypad of mobile radio terminals are depressed unintentionally.

Another object of the invention is to simplify handling of the terminal when said terminal is to be used, and to simplify such handling prior to storing the terminal in a stand-by mode.

Still a further object of the invention is to enable the telephone to be kept in a stand-by mode in a manner which is at least equally as secure as the security obtainable with earlier known keypad protectors, such as the protective flap, cover, or shutter mounted in front of the keypad or the separate additional key or the separate additional keys used to activate and inactivate the keypad.

Another object of the invention is to provide a technical solution to a problem encountered in other technical fields in which keypads are used, and which is well-suited to mobile radio communications and its problems and conditions.

Still a further object of the invention is to provide a solution which does not utilize additional keys that require extra space and increase manufacturing costs.

These objects are achieved with the aid of the inventive method and the inventive arrangement. in brief, the problems are solved in that automatic inactivation of the keypad is initiated subsequent to the expiry of a given time period after the latest key depression.

According to this solution, a time parameter is set to zero with each key depression and a time-measuring process using this time parameter is restarted, whereafter the time parameter is compared with a predetermined threshold value.

More specifically, the invention relates to the activation and automatic inactivation of keys in a keypad of a mobile telephone terminal which also includes a display and means for sensing depression of said keys. A time parameter which denotes the passage of time since the latest arbitrary key depression is set to zero by a device adapted therefor and counting of the value of the time parameter is commenced subsequent to zero setting of the time parameter. The time parameter is compared with a threshold value (Tlock) and inactivation of the keys in the keypad is initiated automatically immediately the time parameter exceeds the threshold value (Tlock). At least one suitably selected key is kept active for inactivation during the time in which the keypad is in an inactivated mode and the terminal is set to its stand-by mode.

The advantages afforded by this problem solution reside in the ease in which the mobile telephone terminal can be handled and stored by a user. Safe-keeping of the mobile telephone terminal is at least equally as reliable as other known solutions described in this document, although the manner in which the terminal is secured, or made safe, is much easier than in the described cases. The terminals can also be given small dimensions, since no space-consuming additional equipment in the form of a flap, cover or separate lock key is required. This also enables manufacturing costs to be kept down. The invention also provides a well-adapted solution for mobile radio communications, particularly when the terminal has a keypad inactivation function that can only be initiated manually.

The invention will now be described in more detail with reference to preferred exemplifying embodiments thereof and also with reference to the accompanying drawings.

DETAILED DESCRIPTION OF PREFERRED EMBODIMENTS

Figure 1A:
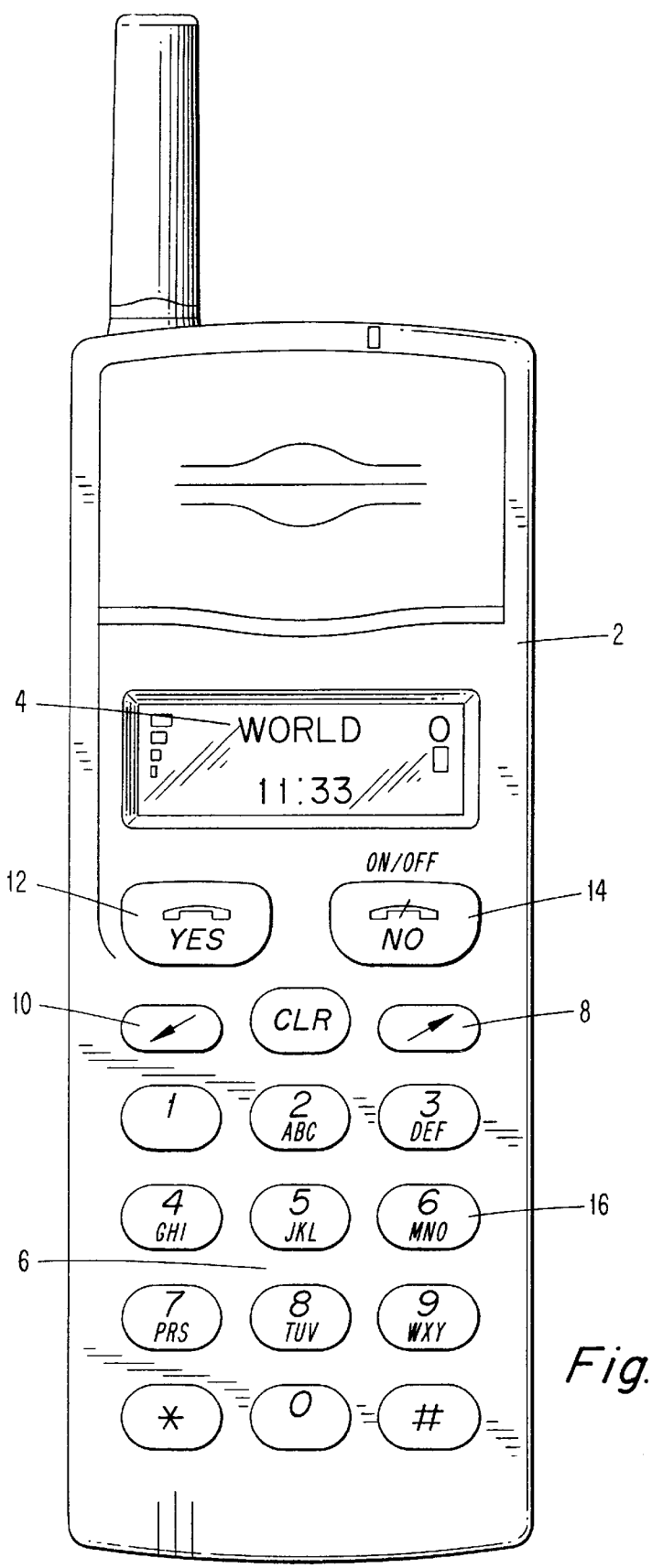
FIG. 1a is a schematic front view of a mobile telephone.

FIG. 1a is a schematic front view of a mobile telephone 2. The mobile telephone includes a display 4 on which there can be displayed a called telephone number, the strength of received signals, battery charge, and different types of function menus. The mobile telephone has a keypad 6 which includes function keys 8–14, a Right-key 8 and a Left-key 10, a Yes-key 12 and a No-key 14, and alphanumeric keys 16. A user of the mobile telephone is able to initiate different functions with the aid of the function-keys and a menu controlling and handling system. The user is able to step between different menus in the menu system with the aid of the Right and Left keys. When using menu functions, the Yes and No keys can be used to answer questions shown on the display. The Yes-key and No-key thus have several functions, depending on the situation in which they are pressed. For instance, they can be used in establishing or releasing a telephone call connection. A terminal of this kind may, in some cases, already be equipped with a menu support inactivation function and with means adapted thereto. This type of inactivation is initiated manually by the terminal user.

Figure 1B:
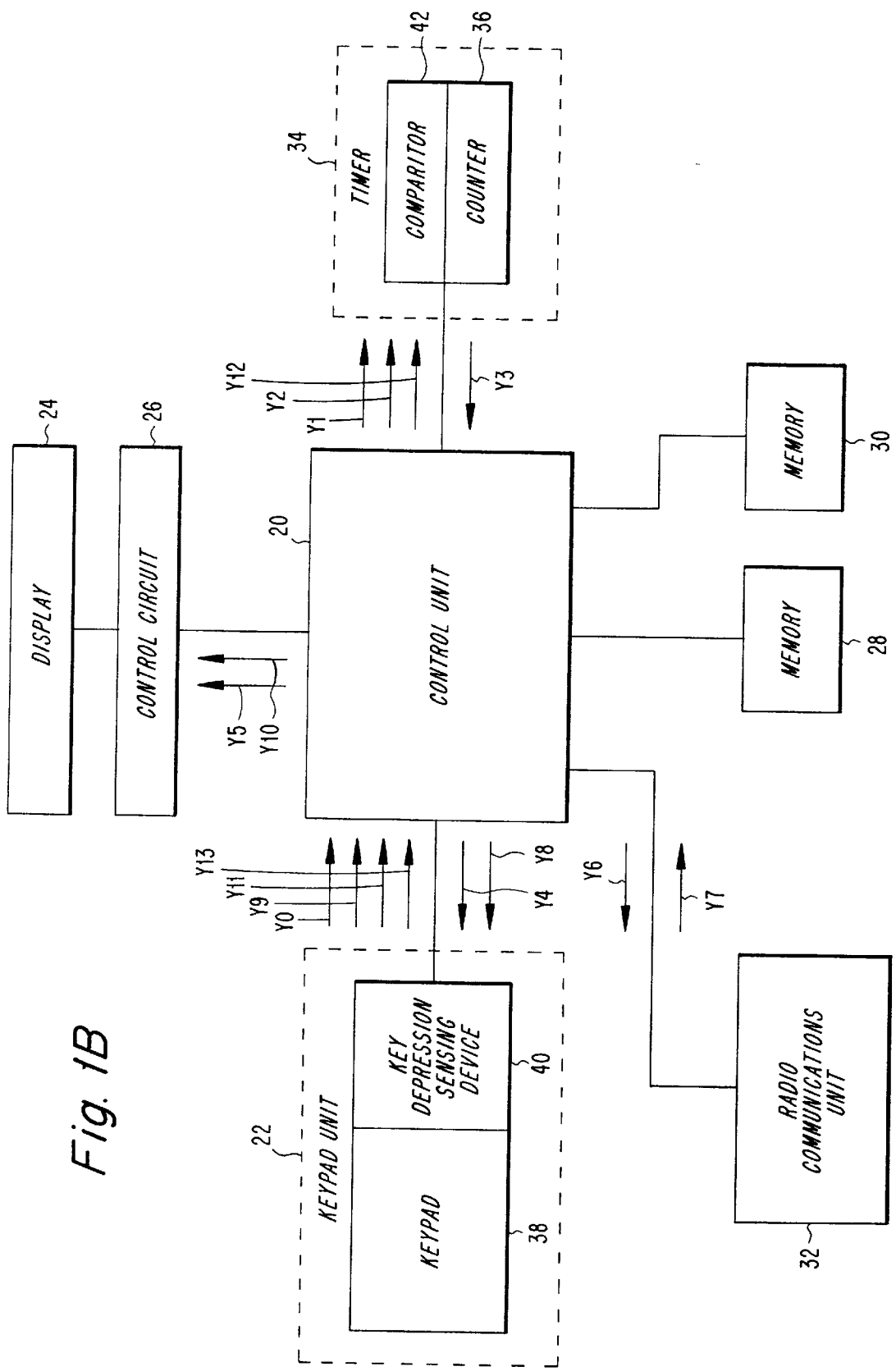
FIG. 1b is a block schematic illustrating means included in the mobile telephone, in accordance with the invention.

FIG. 1b is a block schematic illustrating means included in the mobile telephone in accordance with the invention. The mobile telephone includes a control unit 20 which controls the inventive method. The control unit includes a microprocessor with associated connected circuits. Among other things, the control unit controls scanning of a keypad unit 22, presentation of menus on the display 24 through the medium of a control circuit 26, and storage and reading of data in various memories 28 and 30. These memories may be of the type RAM, ROM, EEPROM, etc. The control unit also communicates with other parts of the mobile telephone, such as with a radio communications-unit 32, which may also be microprocessor-controlled. The mobile telephone also includes other means and function units, although these have not been shown since they are irrelevant to the description of the present invention.

The control unit is connected to a timer 34 which includes a counter 36 that functions to count-up a time parameter t, and a comparitor 42. The time parameter t can be started with a start signal and zeroized with a reset signal from the control unit.

The control unit is connected to the keypad unit, which includes a keypad 38 and a device for detecting or sensing key depressions 40. The key depression sensing device registers an activation signal Y0 and applies said signal to the control unit each time a key is depressed, irrespective of the nature of said key. In response to the activation signal, Y2, the control unit first delivers a reset signal Y1 to the counter, therewith setting the time parameter t to zero, and thereafter delivers a start signal y2 which commences counting of the time parameter t, said time parameter being counted-up after each key depression, until a new key depression is registered. The value of the time parameter t is read periodically and stored in the comparitor 42, in which a threshold value Tlock is also stored. This time value corresponds to the longest time that the keypad is active after a latest key depression.

The comparitor 42 reads the time parameter t, compares the threshold value Tlock and decides whether or not the time parameter value t exceeds the threshold value Tlock, i.e. the comparitor checks whether or not t>Tlock. When this condition is fulfilled, the comparitor applies an alarm signal Y3 to the control unit 20, which then delivers an inactivation signal Y4 to the key pad unit 22. This unit then immediately inactivates all keys with the exception of one, which remains activated so as to enable the user to reactivate the remainder of the keypad.

By inactivated is meant generally that when a key is depressed, the control unit will no longer register with associated circuits any signal or information from the key or keys that are inactivated. The remaining circuits of the mobile telephone are not affected. This inactivating process shall not therefore be confused with the known locking procedures. On the other hand, a terminal that is equipped with a menu-supported manual inactivation function and which includes manual keypad inactivating means adapted thereto may be equipped with an automated function without requiring comprehensive structural modifications. These inactivation means can then be incorporated in the keypad unit.

The control unit also delivers to the counter a reset signal which causes the time parameter value to be set to zero. The control unit also delivers to the display control circuit 26 a keylock-signal Y5 which causes the word Keylock to be displayed, therewith informing the mobile telephone user that the keypad is inactive. The control unit also delivers to the radio communications unit 32 a stand-by signal which places the radio communications unit in a waiting mode. If the radio communications unit is not already in a wait mode, the unit is switched to this mode upon receipt of the signal Y6.

The control unit is in a wait mode when the keypad is inactive. In this mode, the control unit monitors and senses when a signal from the keypad unit or radio communications unit is registered. An activation signal is delivered to the keypad unit when one of the following events occurs, for instance:

The single-active key (the Left or the Right key) is activated.

A new call is received by the radio communications unit.

The battery needs charging.

When a call is received, the radio communications unit delivers a call signal Y7 to the control unit, which in turn delivers an activation signal Y8 to the keypad unit 22, which activates all keys in response thereto.

When the control unit is in its wait mode, the keypad is inactivated and the radio communications unit is in its stand-by mode and a stand-by menu and the word Keylock are shown on the display. When wishing to activate the keypad, the user depresses the sole activated key (8 or 10). The device for sensing the depression of keys in the keypad unit delivers an alert signal Y9 to the control unit, which, in turn, delivers the start signal Y2 to the counter, a menu switch signal Y10 to the display control circuit 26, and the activating signal Y8 to the keypad unit. Because the display displays Keylock in the stand-by menu, the menu switch signal Y10 will result in a switch of menus to the keylock menu in which the question Unlock? is shown. As before mentioned, the mobile telephone is equipped with keys for responding to questions asked in a menu. Each question shall be answered with a Yes or a No, through the Yes-key and No-key respectively.

Thus, if the first key depression was unintentional, either the Yes-key or the No-key will be pressed-in.

If the Yes-key is depressed, a Yes-signal Y11 is delivered to the control unit, which, in turn, delivers an activating signal Y8 to the keypad unit, a reset signal Y12 to the counter, and the menu switch signal Y10 to the display control circuit. The radio communications unit is in a stand-by mode and hence the stand-by menu is shown, although without the word Keylock. The keypad is now activated and the control unit returns to its start mode.

If the No-key is depressed, a No-signal Y13 is delivered to the control unit, which, in turn, delivers the inactivating signal Y4 to the keypad unit, the reset signal Y12 to the counter and a menu switch signal Y10 to the display control circuit. The radio communications unit is in a stand-by mode and hence the stand-by menu and the word Keylock are displayed. The keypad is now again inactivated and the control unit in a waiting mode for activation of the keypad unit.

If, on the other hand, the sole activated key had been pressed unintentionally, it is highly probable that the value of the time parameter t will exceed the threshold value Tlock. Because the terminal is menu-based, the control unit will only accept a reply to the menu question and hence no signals other than Yes and No will be accepted. In practice, only the Yes and the No keys will be activated during the short time, Tlock, that the keypad is activated. Should any of these keys be inadvertently pressed during the activated time period, depression of the No-key will cause the terminal to be inactivated whereas depression of the Yes-key will solely reactivate the keypad for a time period corresponding to Tlock. In this latter case, it is highly probable that no further unintentional depression of a key will occur.

The threshold value Tlock will preferably be selected in a manner which will not place the terminal user under stress between the times of pressing the keys, because of the short Tlock time. On the other hand, Tlock should not be selected so that Tlock would result in a high probability of unintentional depression of a key. The longer the keypad is activated, the greater the probability of unintentional depression of a key. The value of Tlock will preferably lie in the range of 15–60 seconds, although shorter or longer time intervals are conceivable.

The control unit maintains the inactivation procedure in a start mode until the terminal radio communications part gives an all-clear signal. If a call is incoming, the radio communications part delivers a call signal to the control unit. The control unit will then immediately interrupt the inactivation procedure, if this procedure is in progress, and places the procedure in its start mode and awaits an all-clear signal. A reset signal is sent automatically to the counter, when the inactivation process is interrupted.

Figure 2:
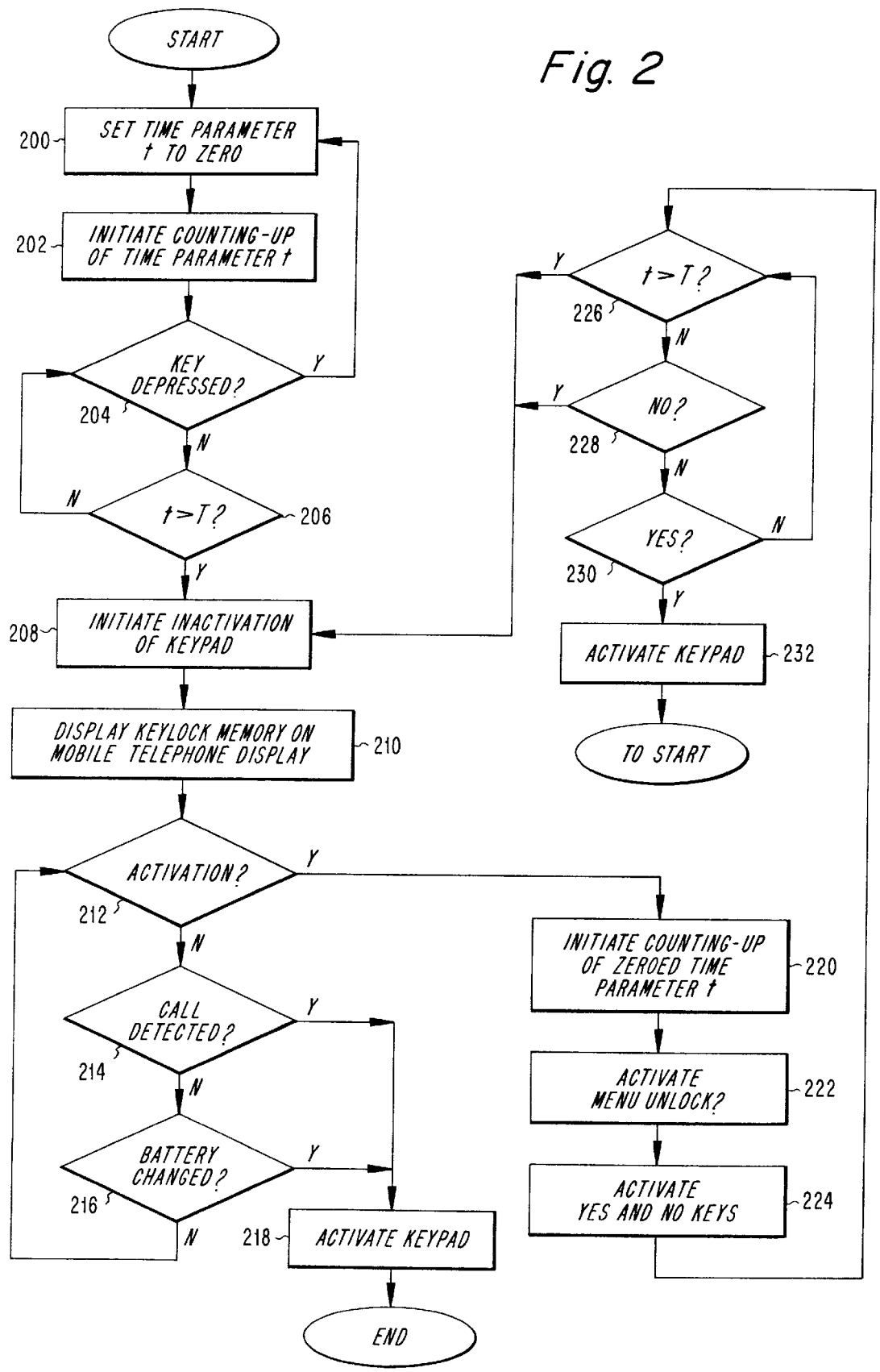
FIG. 2 is a schematic flowchart illustrating an inventive method for activating and automatically inactivating the keypad of the mobile telephone.

FIG. 2 is a schematic flowchart illustrating an inventive method for activating and automatically inactivating the keypad of a mobile telephone.

When the method is initiated, the control unit is in a start mode. The control unit senses that no calls are ongoing and that the keypad is activated. Fulfillment of the start conditions enables the control unit to initiate the inactivation procedure, which will now be described in more detail.

The time parameter t is set to zero in step 200, and counting-up of the time parameter t is initiated in the following step 202. A check is carried out in step 204 to ascertain whether depression of a key has been registered. If the response is in the negative, a check is carried out in step 206 to ascertain whether or not the time parameter t is greater than the threshold value Tlock. If the response is negative, a further check is carried out to ascertain whether a key depression has been registered in step 204.

If the response to the check in step 204 is in the affirmative, the time parameter t is set to zero in step 200 and the procedure re-initiated.

When the response to the check in step 206 is in the affirmative, i.e. the time parameter t is greater than the threshold value Tlock, inactivation of the keypad is initiated in step 208.

In inactivating the keypad, the time parameter t is set to zero and the mobile telephone is set automatically to a stand-by mode, if this has not already been done manually by the user.

As a result of this inactivation, the Keylock memory is displayed on the mobile telephone display in step 210. A check is then carried out in step 212, to ascertain whether or not the activation key has been pressed. If the response is in the negative, a check is carried out in step 214 to ascertain whether or not an incoming call has been detected. If the response is in the negative, a check can be carried out in step 216 to ascertain whether or not a battery change has been commenced. If the response is in the negative, the check is repeated in step 212. These checks 212–216 are carried out until one of the checks produces an affirmative response.

When the response to the check carried in step 214 or in step 216 is in the affirmative, the keypad is activated in step 218. This enables the mobile telephone to be used in a conventional manner for receiving the incoming call, for instance.

When the response to the check carried out in step 212 is affirmative, counting-up of the zeroed time parameter t is initiated in step 220. The menu Unlock? is activated on the display in step 222, which results in activation of the Yes and No keys in step 224. A check is then carried out in step 226 to ascertain whether or not the time parameter t is greater than the threshold value Tlock. If the response is negative, it is checked in step 228 whether or not the No-key has been pressed. If the response is negative, a check is carried out in step 230 to ascertain whether or not the Yes-key has been pressed. If the response is negative, the check in step 226 is repeated to ascertain whether or not the time parameter t is greater than the threshold value Tlock. When the response to the check in step 226 is in the affirmative, i.e. when the time parameter t is greater than the threshold value Tlock, inactivation of the keypad is re-initiated in step 208. In activation of the keypad in step 208 is also initiated when an affirmative response is given in step 228, i.e. when the No-key has been pressed.

If the response in step 230 is affirmative, activation of the keypad is effected in step 232, wherewith the mobile telephone is ready for use for an outgoing call, for instance.

When the keypad is again activated, the method is restarted, wherein the control unit returns to its start mode. As before mentioned, the control unit senses that no calls are in progress and that the keypad is activated. When the start conditions are fulfilled, the control unit again initiates the inactivation procedure in step 200.

As an alternative embodiment, the terminal may be equipped with a voice decoder. This enables the user to activate the keypad with a simple programmed command. The decoder sends signals to the control unit, which in turn sends an activation signal to the keypad. All keys on the keypad can be maintained inactivated in this way.

I claim:

1. A method of activating and automatically inactivating the keys of a mobile telephone terminal keypad, wherein the terminal includes a radio communications unit, a control unit, a display, and key depression sensing means, wherein the method comprises the steps of:

zeroizing a time parameter which denotes the length of time that has passed since one of the keys in the keypad was last pressed;

starting the count-up of the value of the time parameter subsequent to zeroizing said parameter;

comparing the time parameter with a threshold value (Tlock);

initiating the automatic inactivation of keys in the keypad immediately the time parameter exceeds the threshold value (Tlock); and keeping one predetermined key activated for activation during the period in which the keypad is in an inactivated mode.

2. A method according to claim 1, wherein it comprise the step of setting the terminal in a stand-by mode.

3. An arrangement for activating and automatically inactivating keys in a mobile telephone terminal keypad, wherein the terminal includes a radio communications unit, a control unit, a display, and key depression sensing means, wherein the arrangement includes:

means for zeroizing a time parameter that denotes the length of time that has passed since any of the keys were last pressed;

means for comparing the time parameter with a threshold value (Tlock);

means for initiating the automatic inactivation of keys in the keypad immediately the time parameter exceeds the threshold value (Tlock);

means for keeping one appropriately selected key activated for activation during the time in which the keypad is in an inactivated mode.

4. An arrangement according to claim 3, wherein the arrangement includes means for setting the terminal to a stand-by mode.

5. An arrangement according to claim 3, wherein the key that is held activated to enable activation of other keys in the keypad is a function key.

6. An arrangement according to claim 4, wherein the key that is held activated to enable activation of other keys in the keypad is a function key.

7. A method according to claim 1, wherein the key that is kept activated for activation of other keys in the keypad is a function key.

8. A method according to claim 2, wherein the key that is kept activated for activation of other keys in the keypad is a function key.

* * * * *